United States Patent
Odahara et al.

(10) Patent No.: US 7,028,794 B2
(45) Date of Patent: Apr. 18, 2006

(54) TRANSMISSION GEAR APPARATUS FOR MOTOR VEHICLE

(75) Inventors: Kazuhiro Odahara, Tokyo (JP); Yutaka Kitamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 57 days.

(21) Appl. No.: 10/372,792

(22) Filed: Feb. 26, 2003

(65) Prior Publication Data

US 2004/0164560 A1      Aug. 26, 2004

(51) Int. Cl.
*B60K 1/00* (2006.01)

(52) U.S. Cl. .................. 180/65.2; 180/65.4; 475/5

(58) Field of Classification Search ........... 180/65.1, 180/65.2, 65.3, 65.4; 475/5, 149, 154, 284, 475/285, 286, 287, 292, 317, 318, 320; 477/4, 477/5

See application file for complete search history.

(56) References Cited

U.S. PATENT DOCUMENTS

| | | | |
|---|---|---|---|
| 4,870,875 A | | 10/1989 | Morishita |
| 5,378,210 A | * | 1/1995 | Teraoka ...................... 475/312 |
| 5,842,944 A | | 12/1998 | Morishita et al. |
| 6,048,288 A | * | 4/2000 | Tsujii et al. ................... 477/5 |
| 6,073,456 A | * | 6/2000 | Kawai et al. .................. 62/133 |
| 6,093,974 A | * | 7/2000 | Tabata et al. ............. 290/40 R |
| 6,302,227 B1 | * | 10/2001 | Takemura et al. ......... 180/65.2 |
| 6,333,577 B1 | * | 12/2001 | Kusumoto et al. ...... 310/102 R |
| 6,346,062 B1 | * | 2/2002 | Shimabukuro et al. ........ 477/5 |
| 6,383,114 B1 | * | 5/2002 | Hoshiya et al. ................ 477/2 |
| 6,565,473 B1 | * | 5/2003 | Endo et al. .................. 475/117 |
| 6,582,333 B1 | * | 6/2003 | Man et al. ..................... 475/5 |
| 6,615,940 B1 | * | 9/2003 | Morisawa .................. 180/65.1 |
| 2002/0045508 A1 | | 4/2002 | Man et al. |
| 2002/0117860 A1 | | 8/2002 | Man et al. |

FOREIGN PATENT DOCUMENTS

| | | |
|---|---|---|
| EP | 0 548 955 A1 * | 6/1993 |
| EP | 0 916 546 A2 | 5/1999 |
| JP | 02-264153 | 10/1990 |

* cited by examiner

*Primary Examiner*—Christopher P. Ellis
*Assistant Examiner*—Christopher Bottorff
(74) *Attorney, Agent, or Firm*—Sughrue Mion, PLLC

(57) ABSTRACT

A transmission gear for an automobile includes a dynamo-electric machine operating as a motor and a generator, a dynamo-electric machine control device, a dynamo-electric machine pulley, an auxiliary machine pulley, a crank pulley rotatable relative to or integrally with the crank shaft, a sun gear coupled to the crank pulley, planetary gears each rotatable and revolvable along an outer periphery of the sun gear, a carrier for supporting the planetary gear rotatably and revolvably and connected to the crank shaft, an internal gear meshing with the planetary gear, an electromagnetic clutch for changing over the internal gear between restrained and unrestrained states, an electromagnetic clutch changeover control device, and a one-way clutch provided between the internal gear and the carrier.

10 Claims, 3 Drawing Sheets

TRANSMISSION GEAR APPARATUS FOR MOTOR VEHICLE

BACKGROUND OF THE INVENTION

1. Field of the Invention

The present invention generally relates to a transmission gear apparatus for an automobile or a motor vehicle. More particularly, the present invention is concerned with a transmission gear apparatus for the motor vehicle which can ensure proper transmission gear ratios (also referred to as change gear ratio) for an engine starting operation effected by means of a dynamo-electric machine and an auxiliary machine driving operation performed by an internal combustion engine.

2. Description of Related Art

In a hitherto known or conventional transmission gear apparatus for the motor vehicle disclosed, for example, in Japanese Patent Application Laid-Open Publication No. 264153/1990 (JP-A-2-264153), a pulley mounted on a rotatable shaft of the starter motor and a crank pulley connected to a crank shaft of an internal combustion engine (hereinafter also referred to simply as the engine) through the medium of a planetary gear mechanism are operatively coupled to each other by means of a transmission belt for transmitting a driving force or output torque to each other, and the transmission gear ratio is changed correspondingly in the engine starting operation mode and the electricity generating operation mode through cooperation of a one-way clutch provided between a carrier and a sun gear, ratchet mechanism for retaining/releasing an internal gear and an actuator for actuating the ratchet mechanism.

In the conventional transmission gear apparatus for the motor vehicle of the structure described above, a rotational motive power or output torque of a starter motor is transmitted to the crank pulley from the pulley of the starter motor through the transmission belt and then transmitted from the crank pulley to the crank shaft through the medium of a planetary gear mechanism with a rotation speed being reduced for thereby starting the operation of the engine.

In that case, a sun gear connected to the crank pulley rotates relative to a carrier coupled to the crank shaft at a higher velocity than the latter. However, after the engine starting operation has been completed, the internal gear retained by the ratchet mechanism is released while the starter motor is changed over to the electric generator. Consequently, the rotation speed of the sun gear connected to the crank pulley decreases while that of the carrier coupled to the crank shaft increases. At a time point at which the rotation speed (rpm) of the carrier increases just beyond that of the sun gear, the one-way clutch provided between the carrier and the sun gear is closed or clutched, as a result of which the carrier rotates in union with the sun gear.

When the carrier and the sun gear are operatively coupled to each other through the one-way clutch, an impact torque of large magnitude occurs due to significant difference in the rotation speed between the carrier and the sun gear, which brings about remarkably adverse influence to the life of the one-way clutch, giving rise to a problem.

Furthermore, in the conventional transmission gear apparatus, neither measures nor means is provided for absorbing or mitigating the impact which takes place when an excessively large torque is applied to the internal gear for same reason upon retaining the internal gear by the ratchet mechanism, providing another problem that the gears are injured.

SUMMARY OF THE INVENTION

In the light of the state of the art described above, it is an object of the present invention to provide a transmission gear apparatus for a motor vehicle of a structure which can mitigate or reduce an impact torque taking place when the one-way clutch is closed or coupled after the start of engine operation while protecting the gears from injury by mitigating impact which may take place when an excessively large torque is applied to the internal gear at the time the internal gear is retained.

In view of the above and other objects which will become apparent as the description proceeds, there is provided according to a general aspect of the present invention a transmission gear apparatus for a motor vehicle, which apparatus includes a dynamo-electric machine designed to operate as an electric motor and an electric generator, a dynamo-electric machine changeover control means for changing over operation of the dynamo-electric machine to an electric motor operation mode and an electric generator operation mode, a dynamo-electric machine pulley mounted on a rotatable shaft of the dynamo-electric machine, an auxiliary machine pulley operatively connected to a rotatable shaft of an auxiliary machine for transmitting a motive power to the auxiliary machine, a crank pulley operatively coupled to a crank shaft of an internal combustion engine to be changed over such that the crank pulley can rotate relative to or alternatively integrally with the crank shaft of the internal combustion engine to thereby receive or deliver a motive power, a power transmitting means for operatively coupling the dynamo-electric machine pulley, the auxiliary machine pulley and the crank pulley for transmission of rotational motive power (torque) to one another, a sun gear operatively coupled to the crank pulley and supported rotatably by means of a bearing, planetary gears each supported by means of bearings so as to be each rotatable around its own axis and revolvable along an outer periphery of the sun gear, a carrier for supporting the planetary gears rotatably and revolvably and connected to the crank shaft, an internal gear meshing with the planetary gears at inner peripheral side, an electromagnetic clutch for changing over the internal gear between a restrained state and an unrestrained state, an electromagnetic clutch changeover control means for electrically energizing and deenergizing the electromagnetic clutch, and a one-way clutch provided between the internal gear and the carrier.

By virtue of the arrangement in which the one-way clutch is provided between the internal gear and the carrier, as described above, the impact torque applied to the one-way clutch upon coupling thereof can significantly be reduced when compared with the arrangement in which the one-way clutch is disposed between the carrier and the sun gear or between the internal gear and the sun gear, whereby the life of the one-way clutch can be significantly extended, to a great advantage.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DETAILED DESCRIPTION OF THE EMBODIMENTS

Figure 1:
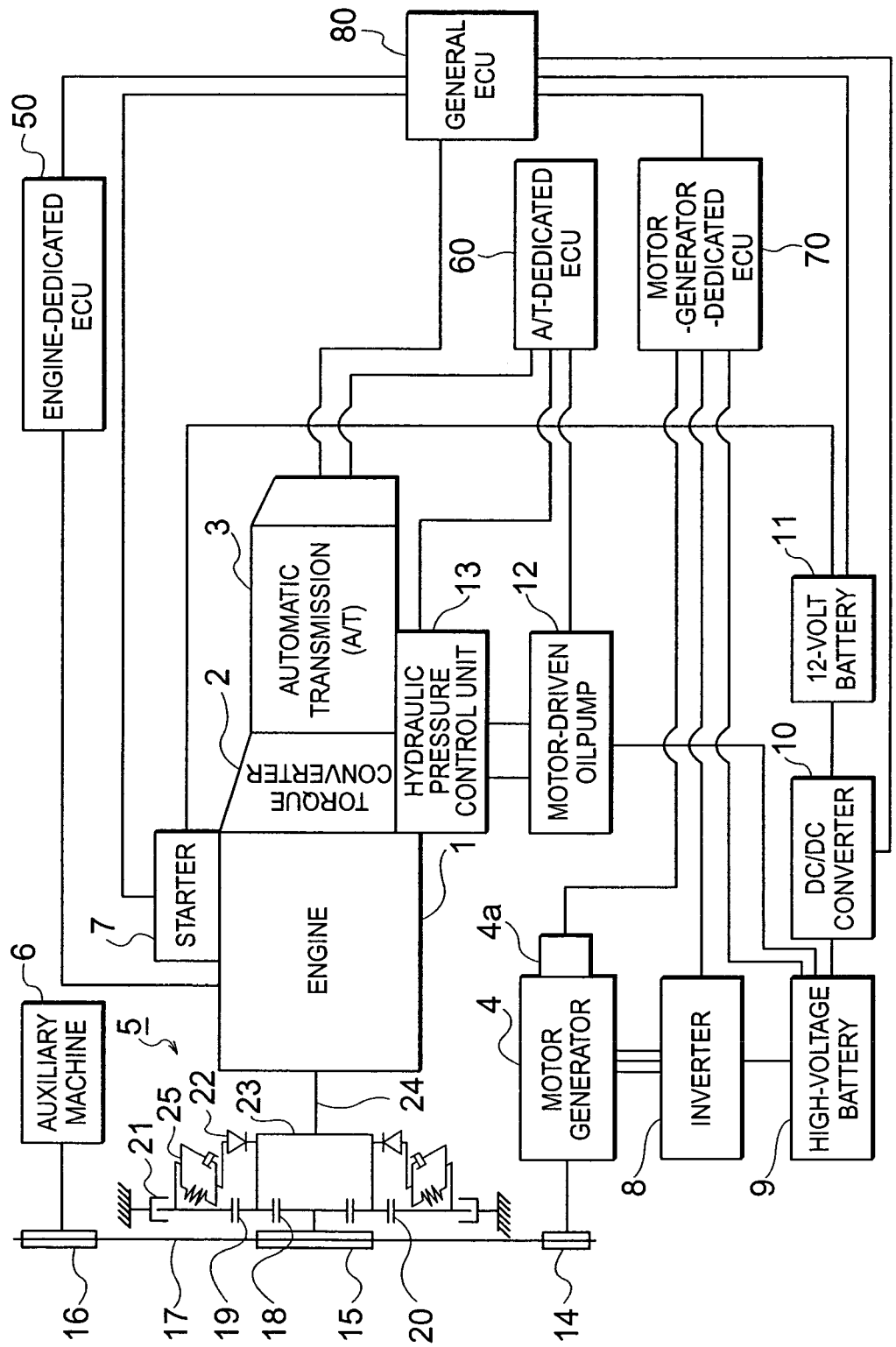
FIG. 1 is a block diagram showing a configuration of an internal combustion engine system for a motor vehicle inclusive of a transmission gear apparatus and peripheral devices.

The present invention will be described in detail in conjunction with what is presently considered as a preferred or typical embodiment thereof by reference to the drawings. In the following description, like reference characters designate like or corresponding parts throughout the several views.

Embodiment 1

FIG. 1 is a block diagram showing a configuration of an internal combustion engine system for a motor vehicle inclusive of a transmission gear apparatus and peripheral devices. Referring to FIG. 1, the engine system includes an internal combustion engine (hereinafter also referred to simply as the engine) 1, a torque converter 2 equipped with a lock-up mechanism, an automatic transmission (hereinafter also referred to as A/T in abbreviation) 3 and a motor generator 4, i.e., a dynamo-electric machine designed to operate exhangeably as an electric motor and an electric generator. The motor generator 4 is equipped with a rotation sensor 4a.

Further referring to FIG. 1, a transmission gear apparatus generally denoted by reference numeral 5 is provided. In an engine starting operation mode, the transmission gear apparatus 5 receives a turning force or torque outputted from the motor generator 4 through a motor-generator pulley (dynamo-electric machine pulley) 14, a belt (power transmitting means) 17 and a crank pulley 15 to thereby transfer the torque to the engine 1 with a reduced rotation speed to thereby start the operation of the engine 1. On the other hand, once the engine operation has been started, the transmission gear apparatus 5 transmits the output torque of the engine 1 to the crank pulley 15 with an even rotation speed. The output torque of the engine 1 transmitted to the crank pulley 15 is then delivered or transferred to the auxiliary machine 6 through the belt 17 and the auxiliary machine pulley 16 on one hand and to the motor generator 4 through the belt 17 and the motor-generator pulley 14 on the other hand, whereby the auxiliary machine 6 and the motor generator 4 are driven, respectively.

A starter 7 is provided in association with the engine 1 in a conventional manner. In the engine system now under consideration, the starter 7 is put into operation only when operation of the engine 1 is to be started after the engine 1 has been stopped continuously over a predetermined time span or when the temperature of cooling water of the engine is lower than a predetermined level inclusive. For issuing a command to trigger the operation of the starter 7, a detecting means is provided for detecting the temperature of the engine cooling water or the continuous engine stoppage duration, although such detecting means is omitted from illustration. Thus, the starter 7 is put into operation on the basis of the output of the detecting means mentioned above.

An inverter 8 provided in association with the motor generator (dynamo-electric machine) 4 serves for converting a DC power of a high-voltage battery 9 to a three-phase AC power upon starting the operation of the engine 1 to supply the AC power to the motor generator 4 so that the motor generator 4 can operate as the electric motor for starting the engine operation, while once the engine operation has been started, the inverter 8 functions to convert an AC power generated by the motor generator 4 which is now driven as the electric generator by the engine 1 into a DC power for electrically charging the high-voltage battery 9.

A DC/DC converter 10 is provided between the high-voltage battery 9 and a 12-volt battery 11 for effectuating power transfer therebetween while transforming the DC voltage.

Further, a motor-driven oil pump 12 is provided which is operated in place of a mechanical oil pump in the engine stopped state for feeding a hydraulic pressure to the torque converter 2 or to the automatic transmission (A/T in abbreviation) for driving/controlling the same through a hydraulic pressure control unit 13 which serves to distribute the hydraulic pressure to the relevant components.

Furthermore, an electronic control unit (hereinafter also referred to as simply as the ECU) 50 is provided for optimally controlling the engine operation. On the other hand, an ECU 60 is provided for controlling the motor-driven oil pump 12 and the hydraulic pressure control unit 13. This ECU 60 will also be referred to as the A/T-dedicated ECU for the convenience of description. Additionally, an ECU 70 is provided for controlling the inverter 8 on the basis of the detected state of charge of the high-voltage battery 9, rotational position information derived from the output of the rotation sensor 4a, the temperature of the high-voltage battery 9 and/or the charge/discharge current information. This ECU 70 will be referred to as the motor-generator-dedicated ECU for the convenience of description. Finally, an ECU 80 is provided which is in charge of controlling the engine-dedicated ECU 50, the A/T-dedicated ECU 60 and the motor-generator-dedicated ECU 70 in a consolidated or harmonized manner. This ECU 80 will be referred to as the general ECU only for the convenience of description.

Figure 2:
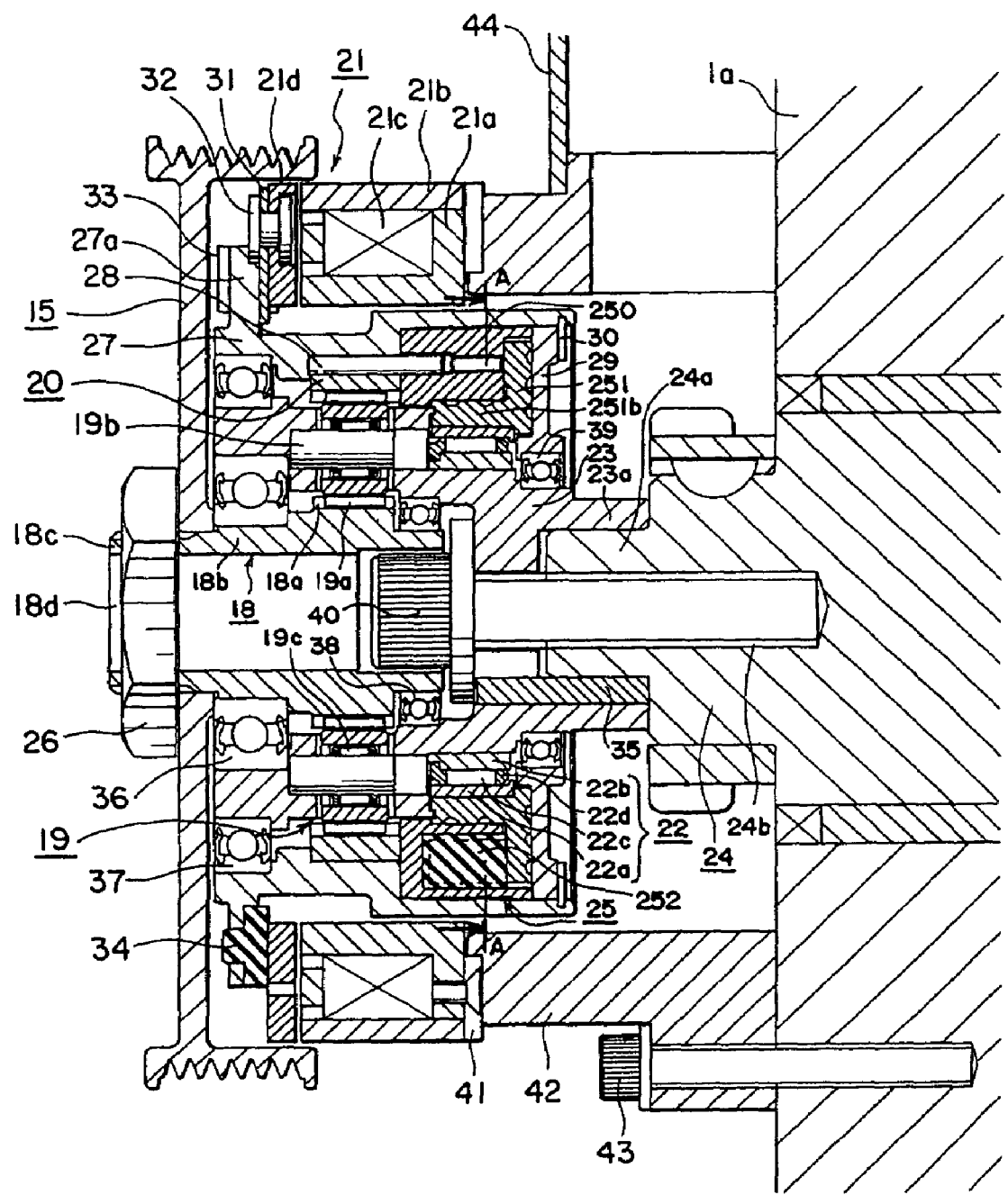
FIG. 2 is a side view showing partly in section the transmission gear apparatus according to an embodiment of the present invention.
Figure 3:
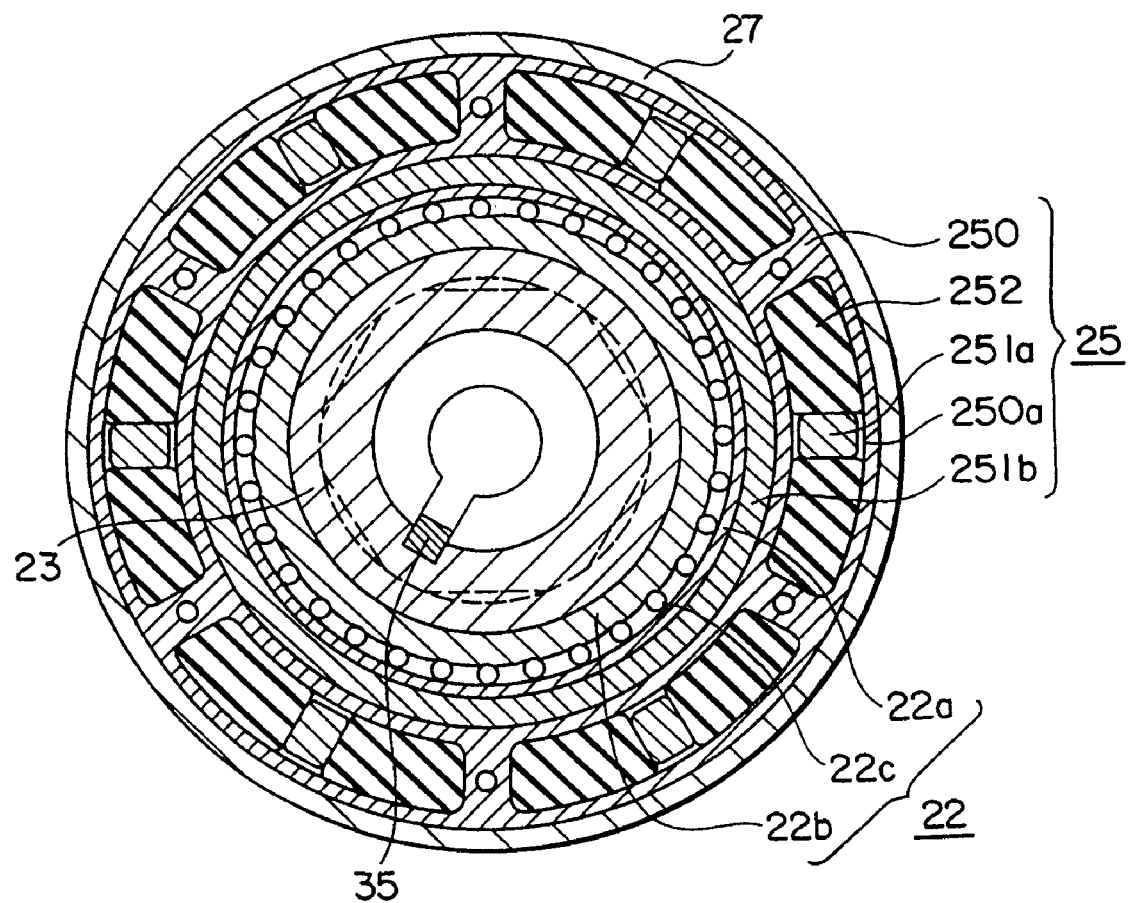
FIG. 3 is a sectional view taken along a line A—A shown in FIG. 2 and viewed in the direction indicated by arrows.

Next, a structure of the speed-change transmission gear apparatus 5 will be described in detail. FIG. 2 is a side view showing partly in section the transmission gear apparatus according to an embodiment of the present invention. FIG. 3 is a sectional view taken along a line A—A shown in FIG. 2 and viewed in the direction indicated by arrows. Referring to FIGS. 2 and 3, the crank pulley 15 has a center hole through which the crank pulley 15 is fit onto a substantially cylindrical shaft portion 18b of a sun gear 18, wherein an inner end face of the crank pulley 15 bears against an end face of an inner race of a bearing 36 which is fit onto the shaft portion 18b of the sun gear 18, while at the outer end face, the crank pulley 15 is fixedly secured to the sun gear 18, being clamped axially by means of a nut 26 which meshes screwwise with a threaded portion 18c of the sun gear 18. With the structure described above, the crank pulley 15, the sun gear 18, the inner race of the bearing 36 and the nut 26 can rotate as a unitary assembly.

Incidentally, an inner race of a bearing 38 is fit onto the shaft portion 18b of the sun gear 18 at an end portion which is located at a side opposite to the end portion on which the bearing 36 is mounted, wherein the outer races of the bearings 36 and 38, respectively, are fixedly and fittingly supported on an inner peripheral surface of a carrier 23.

A planetary gear 19 is mounted on a shaft 19b rotatably around the center axis thereof through the medium of a bearing 19c. The shaft 19b in turn is fittingly and fixedly secured to the carrier 23. The planetary gear 19 is supported by means of bearings 36 and 38 fit to the shaft portion 18b of the sun gear 18 and the inner peripheral surface of the carrier 23 that the planetary gear 19 can revolve coaxially with the shaft portion 18b along the outer periphery of the sun gear 18.

The carrier 23 has a cylindrical portion 23a provided at one end thereof, the carrier 23 being fittingly mounted on a coupling shaft portion 24a of the crank shaft 24 and fixed in the circumferential direction by means of a key 35 while being fixedly secured to the crank shaft 24 in the axial direction by means of a bolt 40. Thus, the carrier 23 is secured to the crank shaft 24 to form a unitary assembly with the latter so that the rotational power (turning force) or torque can be transmitted from the crank shaft 24 to the carrier 23 and vice versa, respectively.

An inner race of a bearing 37 is fixedly fit to the outer peripheral surface of the carrier 23 at the other end portion thereof which is located near to the crank pulley 15, while an outer peripheral bracket 27 is fittingly secured to the outer race of the bearing 37. An internal gear 20 is fittingly mounted on the inner peripheral surface of the outer peripheral bracket 27. Further, a buffer bracket 250 is fittingly inserted. A pin 28 is pressed into a space defined by the end face of a circumferential buffer 25, the inner peripheral surface of the outer peripheral bracket 27 and the outer peripheral surface of the internal gear 20. Thus, the buffer bracket 250, the outer peripheral bracket 27 and the internal gear 20 are assembled together into one unit.

Referring to FIG. 3, a plurality of pockets 250a each of an arcuate shape in section are disposed equidistantly along the whole circumference of the buffer bracket 250. In each of these pockets 250a, an axial projection 251a projecting in the axial direction from a buffer plate 251 is provided at the center of the pocket 250a. Each of the spaces defined in each pocket 250a at both sides of the axial projection 251a as viewed in the circumferential direction is filled with a buffering or cushioning member 252 such as an elastic member formed of e.g. rubber in the compressed state. The buffer bracket 250 defining the pockets 250a, the buffer plate 251 provided with the axial projections 251a and the buffering or cushioning members 252 cooperate to constitute the circumferential buffer 25.

The buffer plate 251 has a cylindrical portion 251b, wherein a one-way clutch 22 is coupled to the inner peripheral surface of the cylindrical portion 251b and the outer peripheral surface of the carrier 23. More specifically, the outer race 22a of the one-way clutch 22 is fixedly fit to the inner peripheral surface of the cylindrical portion 251b of the buffer plate 251 while the inner race 22b of the one-way clutch 22 is press-fit onto the outer peripheral surface of the carrier 23. The one-way clutch 22 includes a plurality of rollers 22c and a retainer 22d disposed between the outer race 22a and the inner race 22b and is so designed as to serve for transmitting the turning force or torque only in one direction.

Parenthetically, in conjunction with the one-way clutch 22, it should be mentioned that when the outer race 22a is rotated clockwise relative to the inner race 22b, as viewed in FIG. 3, the one-way clutch 22 assumes a coupled state while the one-way clutch 22 is set to a non-coupled state (i.e., freely rotatable state) when the outer race 22a is rotated counterclockwise.

An end plate 29 axially restrained by means of a stop ring 30 serves for pushing the buffer plate 251 in the axial direction to prevent the buffering member 252 from being displaced in the axial direction. Further, the inner peripheral surface of the end plate 29 is press-fit onto the outer race of the bearing 39 while the outer peripheral surface of the end plate 29 is fit onto the inner peripheral surface of the outer peripheral bracket 27. Thus, the outer peripheral bracket 27 is supported rotatably relative to the carrier 23 through the medium of the bearing 39 and the end plate 29.

An exciting circuit portion of the electromagnetic clutch 21 is constituted by a field coil 21c wound around a field core 21a and an outer peripheral core 21b press-fit onto the outer periphery of the field core 21a and forming a flux path. The exciting circuit portion is secured to a mounting bracket 42 by means of a mounting plate 41 interposed therebetween.

An armature 21d disposed in opposition to an end face of the field core 21a at a side opposite to the mounting plate 41 with a small gap intervening between the armature 21d and the field core 21a is secured to an outer peripheral end portion of a leaf or plate spring 31 serving as an elastic member by means of rivets 32. On the other hand, an inner peripheral end portion of the leaf or plate spring 31 is secured to a flange portion 27a of the outer peripheral bracket 27 by means of rivets 33. The plate spring 31 resiliently urges the armature 21d in the direction away from the field core 21a.

When the electromagnetic clutch 21 is electrically energized, the armature 21d is attracted toward the field core 21a. On the other hand, upon electrical deenergization of the electromagnetic clutch 21, the armature 21d is retracted toward the flange portion 27a under the elastic force of the plate spring 31. A cushioning member 34 formed of e.g. rubber is disposed between the armature 21d and the flange portion 27a. The cushioning member 34 serves for suppressing collision noise which will be generated upon collision of the armature 21d with the flange portion 27a when the armature 21d is retracted toward the flange portion 27a under the elastic force of the plate spring 31 when the electromagnetic clutch 21 is electrically deenergized.

The motor-generator-dedicated ECU 70 mentioned previously serves as a dynamo-electric machine changeover control means for changing over the motor generator 4 (dynamo-electric machine) between the electric motor operation mode and the electric generator operation mode through the medium of the inverter 8 and at the same time functions as an electromagnetic clutch changeover control means for controlling the electric energization and deenergization of the electromagnetic clutch 21 to thereby change over the internal gear 20 between the restrained state (retained state, i.e., rotation-disabled state) and the unrestrained state (released state, i.e., rotation-enabled state).

Next, description will be directed to operation of the transmission gear apparatus for the motor vehicle according to the instant embodiment of the invention.

When the conditions for starting an economy running operation have been fulfilled, the engine-dedicated ECU 50 outputs a signal for stopping the fuel injection into the individual cylinders of the engine 1 to thereby stop the operation of the engine. In this conjunction, as the conditions for allowing the economy running operation to be started, there may be mentioned, by way of example, such state in which the vehicle seed is zero and the shift lever is not in the range R (reverse) or the depression stroke of the accelerator pedal is zero.

When the engine operation is stopped in the economy running operation mode, the motor generator 4 is operated as the electric motor, whereby the auxiliary machine 6 is driven optimally with a torque and a rotation speed (rpm) in conformance with the load through the medium of the motor-generator pulley 14, the belt 17 and the auxiliary machine pulley 16. At this time point, the electromagnetic clutch 21 of the transmission gear apparatus 5 is electrically deenergized with the armature 21d being in the unrestrained state. Incidentally, as the auxiliary machine 6, there may be mentioned, for example, an AC compressor, power steering oil pump or the like whose operation is required even in the state where the motor vehicle is stopped.

When the motor generator 4 is rotated in the clockwise direction as viewed in the direction orthogonal to a major plane of the motor-generator pulley 14 from the left-hand side in FIG. 1, the crank pulley 15 operatively coupled to the motor generator 4 by the belt 17 also rotates in the clockwise direction, as a result of which the sun gear 18 secured integrally to the crank pulley 15 rotates in the clockwise direction as well. On the other hand, the planetary gear 19 meshing with the sun gear 18 rotates around its axis in the counterclockwise direction. However, since the carrier 23 coupled integrally to the crank shaft 24 of the engine 1 which is stopped remains stationary, the planetary gear 19 does not revolve around the sun gear 18. As a result, the internal gear 20 fittingly secured to the outer peripheral bracket 27 which is coupled to the armature 21d which is in the unrestrained state rotates counterclockwise.

In this case, since the outer race 22a of the one-way clutch coupled to the outer peripheral bracket 27 through the buffer plate 251, the buffering member 252 and the buffer bracket 250 rotates counterclockwise relative to the inner race 22b of the one-way clutch 22 is fit onto the carrier 23, the one-way clutch 22 assumes the opened or uncoupled state and can rotate freely.

As can now be understood from the above description, even when the motor generator 4 is operated as the electric motor while electrically deenergizing the electromagnetic clutch 21 in the state where the engine operation is stopped, the turning force or output torque of the motor generator 4 is transmitted to only the auxiliary machine 6 through the medium of the transmission belt 17 without being transmitted to the crank shaft 24 because the crank pulley 15 and the transmission gear apparatus 5 then rotate freely or idly, i.e., because of the free or idle running of the crank pulley 15 and the transmission gear apparatus 5.

Next, description will turn to the operation when the engine 1 is restarted by the motor generator 4 from the stopped state in which the economy running operation is carried out.

When the conditions for enabling the engine operation to be restarted are fulfilled, the electromagnetic clutch 21 of the transmission gear apparatus 5 is firstly electrically energized, as a result of which the motor generator 4 rotates clockwise as the electric motor, which results in that the turning force or output torque of the motor generator 4 is transmitted to the crank pulley 15 through the medium of the motor-generator pulley 14 and the transmission belt 17.

In the state where the electromagnetic clutch 21 is electrically energized, the armature 21d is electromagnetically attracted to the field core 21a to be thereby restrained fixedly. Consequently, the internal gear 20 is also restrained or constrained through the medium of the leaf or plate spring 31 and the outer peripheral bracket 27. As a result of this, the turning force or torque transmitted to the crank pulley 15 is transferred to the crank shaft 24 through the sun gear 18, the planetary gear 19 and the carrier 23 with the rotation speed being reduced. Thus, the operation of the engine can be started.

Incidentally, at this time point, the internal gear 20 is restrained while the carrier 23 rotates in the clockwise direction. Thus, the one-way clutch 22 is in the uncoupled state (idle running state).

In the restarting operation of the engine 1 by the motor generator 4, as described above, the rotation output speed of the motor generator 4 is decreased or reduced by the pulley ratio between the motor-generator pulley 14 and the crank pulley 15, being further reduced subsequently by the transmission gear apparatus 5. By virtue of this feature, torque of large magnitude which is required for starting the engine operation can be generated even in the case where the motor generator 4 is of a relatively small capacity.

Upon detection of the rotation speed (rpm) of the engine 1 having reached a predetermined rotation speed after the start of engine operation, the electromagnetic clutch 21 is then electrically deenergized. Consequently, the armature 21d and hence the internal gear 20 assume the unrestrained state. Thus, the sun gear 18 and the carrier 23 can rotate freely independent of each other without any power transmission taking place therebetween.

However, in the transmission gear apparatus for the motor vehicle according to the instant embodiment of the present invention, the one-way clutch 22 is provided between the internal gear 20 and the carrier 23 through the medium of the circumferential buffer 25. Consequently, immediately after the electrical deenergization of the electromagnetic clutch 21, the rotation speed (rpm) of the carrier 23 is same as that of the crank shaft 24 to which it is connected. On the other hand, since the sun gear 18 rotates at a speed corresponding to the rotation speed (rpm) of the carrier 23 multiplied by the reduction ratio, the internal gear 20 rotates counterclockwise relative to the carrier 23 while the one-way clutch 22 assumes the uncoupled state.

The rotation seed of the sun gear 18 continues to decrease in the state independent of the carrier 23. At the time point when the rotation speed (rpm) of the carrier 23 increases just beyond that of the sun gear 18, the internal gear 20 starts to rotate clockwise relative to the carrier 23. At this time point, the one-way clutch 22 assumes the operatively coupled state with the internal gear 20 and the carrier 23 being coupled together. Consequently, the planetary gear 19 and the sun gear 18 are operatively coupled together. As a result of this, the crank shaft 24 and the sun gear 18 on one hand and the crank pulley 15 on the other hand rotate at an equal speed, i.e., with a speed ratio of 1:1. Thus, the motor generator 4 is changed over to the electric generator operation mode.

Subsequently, the turning force or output torque of the engine 1 is transmitted distributively through the two paths, i.e., one path extending from the crank shaft 24 to the sun gear 18 via the carrier 23 and the planetary gear 19 and the other path extending from the crank shaft 24 to the sun gear 18 by way of the carrier 23, the one-way clutch 22, the circumferential buffer 25, the internal gear 20 and the planetary gear 19, in the state where the change gear ratio of the transmission gear apparatus 5 is "1". Thus, the auxiliary machine 6 or the motor generator 4 (operating as the electric generator in this case) is driven through the sun gear 18, the crank pulley 15, the belt 17 and the auxiliary machine pulley 16 or the motor-generator pulley 14.

In general, however, in the case where the rotation speed (rpm) of the engine 1 is increased and decreased or the engine rotation speed fluctuates in accompanying the explosive fuel combustions within the cylinders of the engine 1, there may arise such situation that when the rotation speed of the crank shaft 24 tends to increase beyond the rotation speed of the sun gear 18 (or that of the crank pulley 15), i.e., when the rotation speed of the engine 1 is increasing, the one-way clutch 22 is coupled with the change gear ratio of the transmission gear 5 assuming "1", whereas when the rotation speed of the crank shaft 24 decreases lower than that of the sun gear 18, i.e., when the rotation sped of the engine 1 has decreased, the one-way clutch 22 assumes the uncoupled state with the sun gear 18 and the carrier 23 rotating independent of each other, which results in that the rotation speed of the crank shaft 24 tends to again increase beyond the rotation speed of the sun gear 18, and thus the one-way clutch 22 is again coupled with the change gear ratio of the transmission gear apparatus 5 assuming "1".

As is obvious from the above description, when fluctuation or variation (i.e., increase and decrease) occurs in the rotation speed of the engine 1, it is expected that the uncoupled state and the coupled state of the one-way clutch 22 will alternately be repeated in succession upon every fluctuation and that impulsive force or shock or torque will be applied to the one-way clutch 22 upon every coupling thereof. Thus, there arises a fear that the life of the one-way clutch 22 might unwantedly be shortened remarkably, giving rise to a problem.

For coping with the problem mentioned above, in the transmission gear apparatus according to the instant embodiment of the present invention, the one-way clutch 22 is provided between the internal gear 20 and the carrier 23 with interposition of the circumferential buffer 25. By virtue of this arrangement, the impact torque applied to the one-way clutch upon coupling thereof can significantly be reduced when compared with the planetary gear disclosed in Japanese Patent Application Laid-Open Publication No. 264153/1990 cited hereinbefore in which the one-way clutch 22 is disposed between the carrier 23 and the sun gear 18 or the conceivable transmission gear in which the one-way clutch 22 is disposed between the internal gear 20 and the sun gear 18 as described hereinbefore. Thus, in the transmission gear apparatus according to the present invention, the life of the one-way clutch can significantly be extended.

The reason why the shock applied to the one-way clutch 22 upon coupling operation thereof can significantly be reduced in the transmission gear apparatus according to the present invention will be elucidated below in detail. Let's represent the numbers of teeth of the sun gear 18 and the internal gear 20 by a and b (where b>a), respectively, while representing by $N_{s-c}$ the relative rotation speed of the carrier 23 to the sun gear 18 with the relative rotation speeds between the sun gear 18 and the internal gear 20 and between the carrier 23 and the internal gear 20 being represented by $N_{s-i}$ and $N_{c-i}$, respectively, then relations given by the undermentioned expressions apply valid.

$$N_{s-i} = (1 + a/b)N_{s-c}$$

$$N_{c-i} = (a/b)N_{s-c} \quad \text{(where } a/b < 1\text{)}$$

$$\therefore N_{c-i}/N_{s-c} = a/b, \quad N_{c-i}/N_{s-i} = a/(a+b)$$

As is apparent from the above, in the case where the one-way clutch is provided between the carrier 23 and the internal gear 20, coupling operation of the one-way clutch takes place at a relative rotation speed which is lower by a ratio of "a/b" than the relative rotation speed in the transmission gear in which the one-way clutch is disposed between the sun gear 18 and the carrier 23 or lower by a ratio of "a/(a+b)" than the relative rotation speed in the transmission gear in which the one-way clutch is disposed between the sun gear 18 and the internal gear 20. Thus, in the transmission gear apparatus according to the instant embodiment of the invention, the impact torque acting on the one-way clutch upon coupling operation thereof can significantly be reduced.

By way of example, assuming that the number of teeth of the sun gear is "41" with the teeth number b of the internal gear being "79", the ratio a/b is 0.52 while a/(a+b) is equal to 0.34. Obviously, the arrangement in which the one-way clutch is provided between the carrier 23 and the internal gear 20 is very advantageous for lengthening the life span of the one-way clutch.

In addition, in the transmission gear apparatus according to the instant embodiment of the invention, the circumferential buffer 25 is disposed between the one-way clutch and the internal gear. Thus, the impact torque acting on the one-way clutch upon coupling operation thereof can further be mitigated, to a great advantage.

The present invention has provided the transmission gear apparatus for the motor vehicle which includes the dynamo-electric machine designed to operate as the electric motor and the electric generator, the dynamo-electric machine changeover control means for changing over operation of the dynamo-electric machine to the electric motor operation mode and the electric generator operation mode, the dynamo-electric machine pulley mounted on the rotatable shaft of the dynamo-electric machine, the auxiliary machine pulley operatively connected to the rotatable shaft of the auxiliary machine for transmitting the motive power to the auxiliary machine, the crank pulley operatively coupled to the crank shaft of the internal combustion engine to be changed over such that the crank pulley can rotate relative to or alternatively integrally with the crank shaft of the internal combustion engine to thereby receive or deliver the motive power, the power transmitting means for operatively coupling the dynamo-electric machine pulley, the auxiliary machine pulley and the crank pulley for transmission of the rotational motive power (torque) to one another, the sun gear operatively coupled to the crank pulley and supported rotatably by means of the bearing, the planetary gears each supported by means of the bearings so as to be each rotatable around its own axis and revolvable along the outer periphery of the sun gear, the carrier for supporting the planetary gears rotatably and revolvably and connected to the crank shaft, the internal gear meshing with the planetary gears at the inner peripheral side, the electromagnetic clutch for changing over the internal gear between the restrained state and the unrestrained state, the electromagnetic clutch changeover control means for electrically energizing and deenergizing the electromagnetic clutch, and the one-way clutch provided between the internal gear and the carrier.

By virtue of the arrangement in which the one-way clutch is provided between the internal gear and the carrier, as described above, the impact torque applied to the one-way clutch upon coupling thereof can significantly be reduced when compared with the transmission gear apparatus in which the one-way clutch is disposed between the carrier and the sun gear or the one-way clutch is disposed between the internal gear and the sun gear as described hereinbefore, whereby the life of the one-way clutch can significantly be extended, to a great advantage.

Besides, since the electromagnetic clutch is employed as a means for restraining or constraining the internal gear, slippage can occur between the attracting surfaces of the electromagnetic clutch when a large impact torque is applied to the internal gear for some reason, whereby the gears can positively be protected from injury, to another advantage. Moreover, by regulating a field current fed to the field coil of the electromagnetic clutch, the permissible limit for the slippage mentioned above can optimally be regulated.

Further, in the transmission gear apparatus described above, there can be disposed the circumferential buffer which includes the cushioning members and disposed between the internal gear and the one-way clutch for reducing the impact torque which occurs upon coupling of the one-way clutch.

Owing to the arrangement described above, the impact torque acting on the one-way clutch upon coupling thereof can further be mitigated, whereby the life of the one-way clutch can further be extended.

The transmission gear apparatus for the motor vehicle can include the assembly in which the crank pulley, the sun gear, the planetary gear, the carrier, the internal gear, the one-way clutch and the circumferential buffer are assembled together as a unit, and the bolt disposed along the axis of the carrier so as to extend through the carrier for securing the assembly to the internal combustion engine by clamping the carrier to the crank shaft by means of the above-mentioned bolt.

With the arrangement described above, it is possible to install a completed and adjusted assembly simply by securing fixedly the carrier constituting a part of the assembly to the crank shaft by means of the clamping bolt substantially in the same manner as conventionally adopted, whereby the number of steps involved in mounting the various components mentioned above can remarkably be decreased, to another advantageous effects.

In the transmission gear apparatus described above, the electromagnetic clutch can be so arranged as to attract the armature connected to the outer peripheral bracket fit to the internal gear when the electromagnetic clutch is electrically energized, to thereby place the internal gear in the restrained state, the armature being provided with the elastic member for urging the armature toward the outer peripheral bracket in the direction opposite to the direction in which the armature is attracted, to thereby place the internal gear in the unrestrained state, wherein the cushioning member can be disposed between the outer peripheral bracket and the armature.

With the arrangement described above, noise which will otherwise be produced upon collision of the armature with the outer peripheral bracket under the elastic force of the elastic member upon electrical deenergization of the electromagnetic clutch can advantageously be absorbed by the cushioning member.

Further, in the transmission gear apparatus described above, the motive power or torque outputted from the dynamo-electric machine and transmitted through the motor-generator pulley, the power transmitting means and the crank pulley can undergo a speed reduction through the reduction gear mechanism disposed between the crank pulley and the crank shaft, when the operation of the engine is started from the stopped state by means of the dynamo-electric machine.

By virtue of the feature described above, the speed reduction by a pulley ratio between the dynamo-electric machine pulley and the crank pulley is combined with the speed reduction brought about by the planetary gear mechanism disposed between the crank pulley and the crank shaft and serving as the reduction gear mechanism, whereby magnitude of the torque generated by the dynamo-electric machine can effectively be amplified or increased, which makes it possible to employ the dynamo-electric machine and the inverter each of low capacity, advantageously for realization of the apparatus in a small size and light weight at low cost.

Furthermore, in the transmission gear apparatus described above, the crank pulley can be driven from the internal combustion engine at the change gear ratio of "1" relative to the crank shaft during operation of the internal combustion engine.

In general, when the rotational motive power or torque is outputted from the engine to the crank pulley with the rotation speed being increased after the engine operation has been started, there may arise a problem that the dynamo-electric machine or the auxiliary machine may be caused to rotate at a high speed exceeding the permissible limit through the dynamo-electric machine pulley or the auxiliary machine pulley. However, in the transmission gear apparatus according to the present invention, the dynamo-electric machine or the auxiliary machine can be operated within a proper rotation speed range owing to the feature described just above.

Additionally, in the transmission gear apparatus described above, the dynamo-electric machine and the auxiliary machine can be driven by the internal combustion engine through the crank pulley, the power transmitting means and the dynamo-electric machine pulley and the auxiliary machine pulley, respectively, during operation of the internal combustion engine, and the dynamo-electric machine can then be operated as the electric generator.

With the feature described above, one and the same dynamo-electric machine can be operated as the electric motor for starting the engine operation and as the electric generator. Thus, the space for installation can be decreased while the apparatus can be implemented in light weight.

Moreover, in the transmission gear apparatus described above, the motive power transmitted to the crank pulley from the dynamo-electric machine can be inhibited from being transmitted to the crank shaft from the crank pulley by placing the one-way clutch in an uncoupled state, when the auxiliary machine is driven by the dynamo-electric machine in the state in which operation of the internal combustion engine is stopped.

Needless to say, when the rotational power of the dynamo-electric machine is transmitted to the crank shaft through the crank pulley in the state in which the engine is stopped, the engine provides a large load for the dynamo-electric machine. However, in the transmission gear apparatus for the motor vehicle according to the present invention, this problem can satisfactorily be solved by the feature mentioned just above. In other words, the load of the dynamo-electric machine can be reduced, which contributes to energy saving, miniaturization of the dynamo-electric machine, lowering of the inverter capacity and reduction of the manufacturing cost.

Additionally, the transmission gear apparatus for the motor vehicle according to the present invention can further include the starter which is so arranged as to start operation of the internal combustion engine when the load imposed on the internal combustion engine is large.

Obviously, in order that the engine operation can be started by the dynamo-electric machine even when the load imposed on the engine is large, as encountered when the engine operation is to be started from the low temperature state, there will be required the dynamo-electric machine of large size and capacity as well as the inverter of large current capacity, which of course means that lots of cost is involved. Besides, when the engine operation is started from the low temperature state, it is difficult to transmit the rotational motive power to the belt without incurring slippage, giving rise to another problem. However, in the transmission gear apparatus according to the present invention, these problems can satisfactorily be solved by virtue of the aforementioned feature that the starter is employed for starting the engine from the state where the load imposed on the engine is large.

Besides, in the transmission gear apparatus according to the present invention, the starter can be put into operation for starting the operation of the internal combustion engine when the internal combustion engine is to be started after the internal combustion engine has been stopped continuously for a predetermined time period or alternatively for starting the operation of the internal combustion engine when a temperature of cooling water of the internal combustion engine is lower than a predetermined value inclusive.

With the feature described above, determination whether or not the starter is to be used can easily be made by detecting the temperature of the cooling water of the engine or the time period during which the engine has continuously been stopped.

Many modifications and variations of the present invention are possible in the light of the above techniques. It is therefore to be understood that within the scope of the appended claims, the invention may be practiced otherwise than as specifically described.

What is claimed is:

1. A transmission gear apparatus for a motor vehicle, comprising:
   a dynamo-electric machine designed to operate as an electric motor and an electric generator;
   dynamo-electric machine changeover control means for changing over operation of said dynamo-electric machine to an electric motor operation mode and an electric generator operation mode;
   a dynamo-electric machine pulley mounted on a rotatable shaft of said dynamo-electric machine;
   an auxiliary machine pulley operatively coupled to a rotatable shaft of an auxiliary machine for transmitting a motive power to said auxiliary machine;
   a crank pulley operatively connected to a crank shaft of an internal combustion engine to be changed over such that said crank pulley can rotate relative to or alternatively integrally with said crank shaft of said internal combustion engine to thereby receive or deliver a motive power;
   power transmitting means for operatively coupling said dynamo-electric machine pulley, said auxiliary machine pulley and said crank pulley for transmission of rotational motive power to one another;
   a sun gear operatively coupled to said crank pulley and supported rotatably by means of a bearing;
   planetary gears each supported by means of bearings so as to be each rotatable around its own axis and revolvable along an outer periphery of said sun gear;
   a carrier for supporting said planetary gears rotatably and revolvably and connected to said crank shaft;
   an internal gear meshing at an inner peripheral side thereof with said planetary gears;
   an electromagnetic clutch for changing over said internal gear between a restrained state and an unrestrained state;
   electromagnetic clutch changeover control means for electrically energizing and deenergizing said electromagnetic clutch; and
   a one-way clutch provided between said internal gear and said carrier, wherein said internal gear is coupled to a first side of said one-way clutch and said carrier is coupled to a second side of said one-way clutch.

2. A transmission gear apparatus for a motor vehicle according to claim 1, further comprising:
   a circumferential buffer including a cushioning member and disposed between said internal gear and said one-way clutch for reducing impact torque occurring upon coupling of said one-way clutch.

3. A transmission gear apparatus for a motor vehicle according to claim 1, comprising:
   an assembly in which said crank pulley, said sun gear, said planetary gear, said carrier, said internal gear, said one-way clutch and said circumferential buffer are assembled together as a unit; and
   a bolt disposed along an axis of said carrier so as to extend through said carrier for securing said assembly to said internal combustion engine by clamping said carrier to said crank shaft by means of said bolt.

4. A transmission gear apparatus for a motor vehicle according to claim 1,
   wherein said electromagnetic clutch is so arranged as to attract an armature connected to an outer peripheral bracket fit to said internal gear when said electromagnetic clutch is electrically energized, to thereby place said internal gear in a restrained state, said armature being provided with an elastic member for urging said armature toward said outer peripheral bracket in a direction opposite to the direction in which said armature is attracted, to thereby place said internal gear in a unrestrained state, and wherein a cushioning member is disposed between said outer peripheral bracket and said armature.

5. A transmission gear apparatus for a motor vehicle according to claim 1,
   wherein upon starting operation of said internal combustion engine from an engine-stopped state by means of said dynamo-electric machine, the motive power outputted from said dynamo-electric machine and transmitted through said dynamo-electric machine pulley, said power transmitting means and said crank pulley undergoes a speed reduction through a reduction gear mechanism disposed between said crank pulley and said crank shaft.

6. A transmission gear apparatus for a motor vehicle according to claim 5,
   wherein during operation of said internal combustion engine, said crank pulley is driven from said internal combustion engine at a change gear ratio of "1" relative to said crank shaft.

7. A transmission gear apparatus for a motor vehicle according to claim 6,
   wherein during operation of said internal combustion engine, said dynamo-electric machine and said auxiliary machine are driven by said internal combustion engine through said crank pulley, said power transmitting means and said dynamo-electric machine pulley and said auxiliary machine pulley, respectively, said dynamo-electric machine then operating as an electric generator.

8. A transmission gear apparatus for a motor vehicle according to claim 7,
   wherein when said auxiliary machine is driven by said dynamo-electric machine in a state in which operation of said internal combustion engine is stopped, the motive power transmitted to said crank pulley from said dynamo-electric machine is inhibited from being transmitted to said crank shaft from said crank pulley by placing said one-way clutch in an uncoupled state.

9. A transmission gear apparatus for a motor vehicle according to claim 1, further comprising a starter which is so arranged as to start operation of said internal combustion engine when a load imposed on said internal combustion engine is large.

10. A transmission gear apparatus for a motor vehicle according to claim 9, wherein said starter is put into operation for starting the operation of said internal combustion engine when said internal combustion engine is to be started after said internal combustion engine has been stopped continuously for a predetermined time period or alternatively for starting the operation of said internal combustion engine when a temperature of cooling water of said internal combustion engine is lower than a predetermined value inclusive.

\* \* \* \* \*